United States Patent
Barber

(10) Patent No.: US 9,736,502 B2
(45) Date of Patent: Aug. 15, 2017

(54) SYSTEM, DEVICE, AND METHOD FOR PROVIDING AUDIENCES FOR LIVE VIDEO STREAMING

(71) Applicant: Alan H. Barber, Dripping Springs, TX (US)

(72) Inventor: Alan H. Barber, Dripping Springs, TX (US)

(*) Notice: Subject to any disclaimer, the term of this patent is extended or adjusted under 35 U.S.C. 154(b) by 7 days.

(21) Appl. No.: 14/879,973

(22) Filed: Oct. 9, 2015

(65) Prior Publication Data

US 2017/0078707 A1    Mar. 16, 2017

Related U.S. Application Data

(60) Provisional application No. 62/218,369, filed on Sep. 14, 2015.

(51) Int. Cl.
*H04N 21/21* (2011.01)
*H04N 21/488* (2011.01)
(Continued)

(52) U.S. Cl.
CPC ....... *H04N 21/2187* (2013.01); *H04N 21/251* (2013.01); *H04N 21/252* (2013.01);
(Continued)

(58) Field of Classification Search
CPC ............. H04N 21/435; H04N 21/4622; H04N 21/4722; H04N 21/25891; H04N 21/4782; H04N 21/8133; H04N 21/2187; H04N 21/21805; H04N 21/4788; H04N 21/6125; H04N 21/858; H04L 51/32; H04L 67/22; H04L 51/04; H04L 12/1831; H04L 65/4084; G06N 99/005; G06N 5/04; G06N 5/046; G06N 7/005; G06N 5/02; G06N 5/048
See application file for complete search history.

(56) References Cited

U.S. PATENT DOCUMENTS 8,694,612 B1    4/2014   Schoenberg
8,701,153 B2    4/2014   Abrams
(Continued)

*Primary Examiner* — Pankaj Kumar
*Assistant Examiner* — Alazar Tilahun
(74) *Attorney, Agent, or Firm* — IDP Patent Services; Olav M. Underdal

(57) ABSTRACT

A system for live video streaming includes a live video server, including a processor, a non-transitory memory, an input/output component, an interest manager, a video content manager, a video feed manager, a broadcast controller, a social network controller, and a data bus; a live video receiving device, including an interest controller, a notification controller, and a streaming viewer; a live video broadcasting device, including a content controller and a streaming transmitter; a broadcast management system and a social network system; such that a user receives a timely notification for a live broadcast matching the users subject matter interests, such that the user can watch the live broadcast; and the system provides interested audiences to broadcasting users that provide live video content. Also disclosed is a method for live video streaming, including registering broadcast schedule; registering subject matter content; registering subject matter interest; sending notification; and watching broadcast.

13 Claims, 5 Drawing Sheets

System for Live Video Streaming

(51) Int. Cl.

| | |
|---|---|
| *H04N 21/258* | (2011.01) |
| *H04N 21/45* | (2011.01) |
| *H04N 21/475* | (2011.01) |
| *H04N 21/25* | (2011.01) |
| *H04N 21/466* | (2011.01) |
| *H04N 21/2187* | (2011.01) |
| *H04N 21/61* | (2011.01) |
| *H04N 21/458* | (2011.01) |
| *H04N 21/262* | (2011.01) |
| *H04N 21/4788* | (2011.01) |
| *H04N 21/482* | (2011.01) |
| *H04N 21/2743* | (2011.01) |
| *H04N 21/4223* | (2011.01) |
| *H04N 21/63* | (2011.01) |
| *H04N 21/6547* | (2011.01) |
| *H04L 12/58* | (2006.01) |

(52) U.S. Cl.
CPC ..... *H04N 21/25891* (2013.01); *H04N 21/262* (2013.01); *H04N 21/2743* (2013.01); *H04N 21/4223* (2013.01); *H04N 21/458* (2013.01); *H04N 21/4532* (2013.01); *H04N 21/4667* (2013.01); *H04N 21/4756* (2013.01); *H04N 21/4788* (2013.01); *H04N 21/4826* (2013.01); *H04N 21/4882* (2013.01); *H04N 21/6125* (2013.01); *H04N 21/632* (2013.01); *H04N 21/6547* (2013.01); *H04L 51/32* (2013.01)

(56) References Cited

U.S. PATENT DOCUMENTS

| | | |
|---|---|---|
| 8,842,007 B2 | 9/2014 | Packard et al. |
| 8,881,191 B2 | 11/2014 | Magdy et al. |
| 8,925,007 B2 | 12/2014 | Packard et al. |
| 8,930,414 B2 | 1/2015 | Giblin |
| 9,060,210 B2 | 6/2015 | Packard et al. |
| 9,094,362 B2 | 7/2015 | Lee et al. |
| 2009/0172736 A1* | 7/2009 | Tsui .................. H04N 5/44543 725/40 |
| 2009/0282436 A1 | 11/2009 | Perry |
| 2010/0188485 A1* | 7/2010 | Abrams ................. H04N 5/247 348/46 |
| 2013/0262293 A1* | 10/2013 | Garner, Jr. ............. G06Q 10/10 705/39 |
| 2013/0304575 A1* | 11/2013 | Fetyko ................. H04L 65/403 705/14.53 |
| 2014/0282748 A1* | 9/2014 | McNamee ......... H04N 21/6193 725/63 |
| 2016/0037227 A1* | 2/2016 | Benn ................. H04N 21/4828 725/53 |

\* cited by examiner

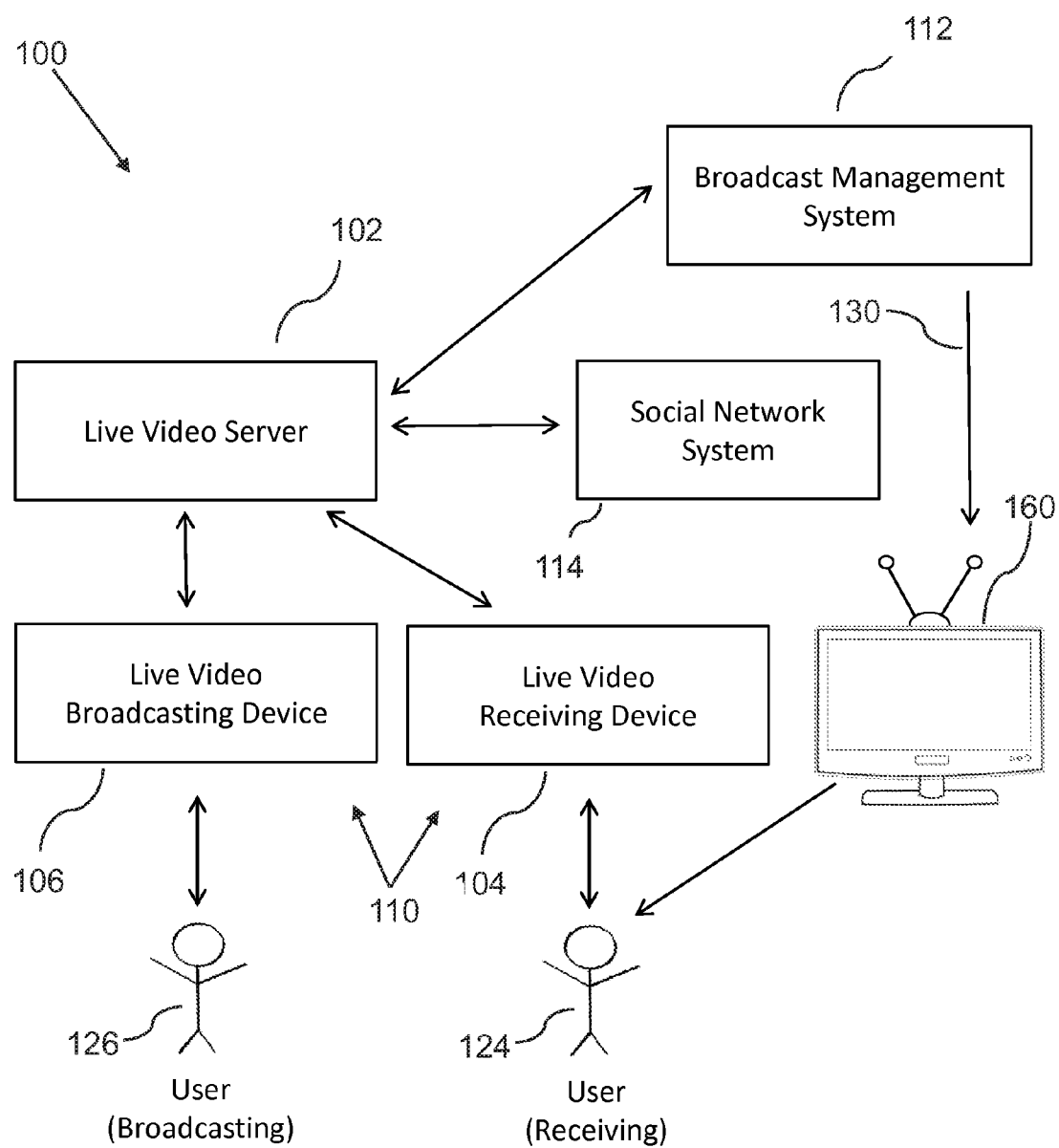

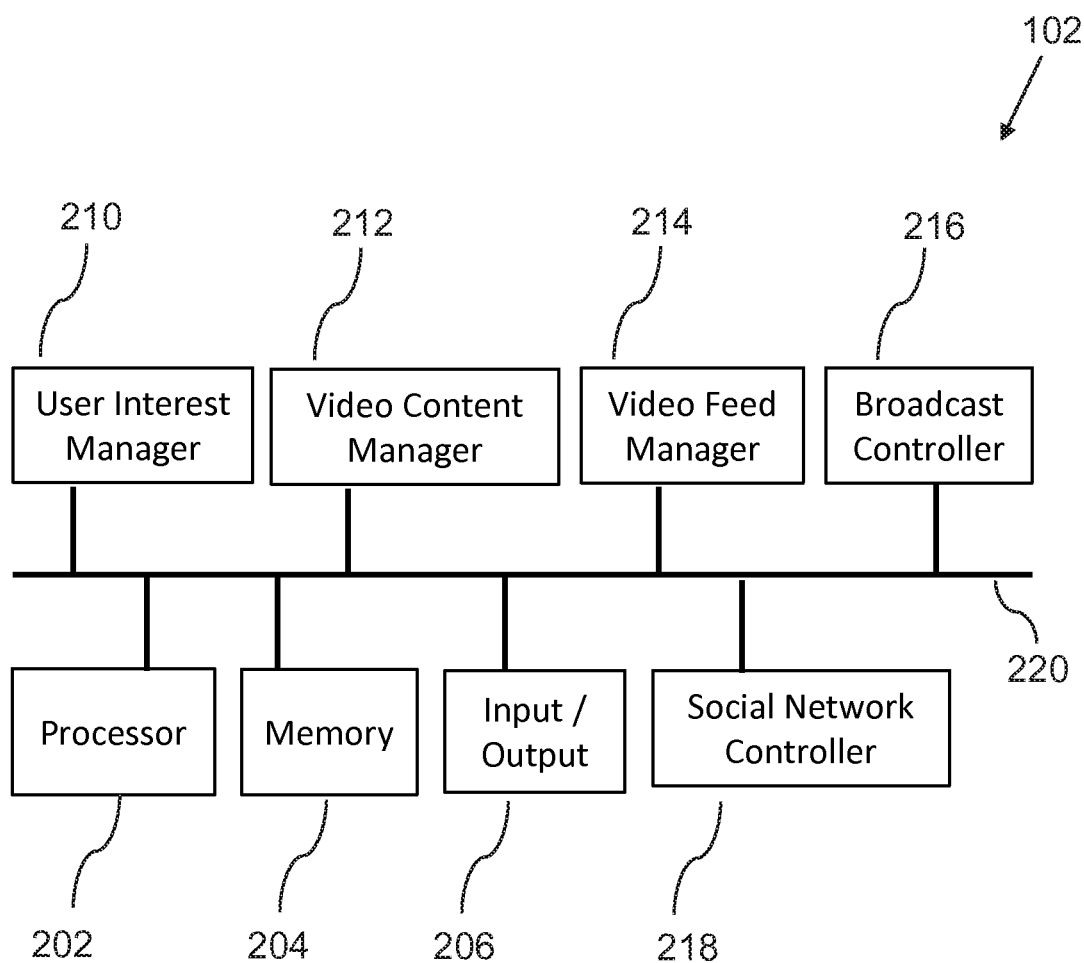

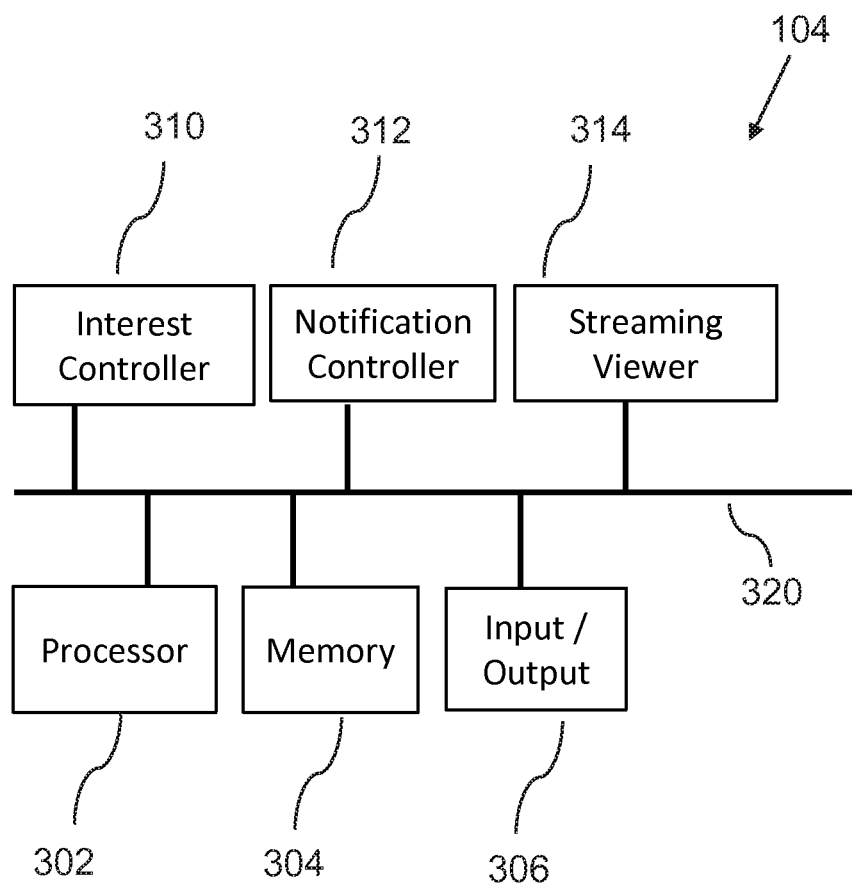

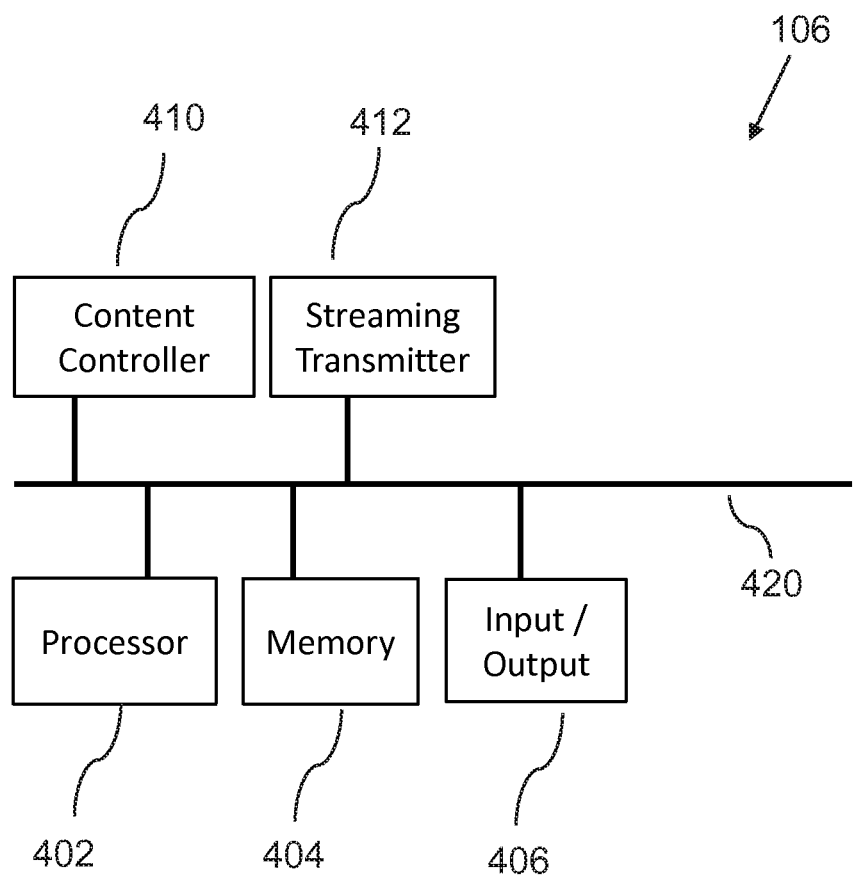

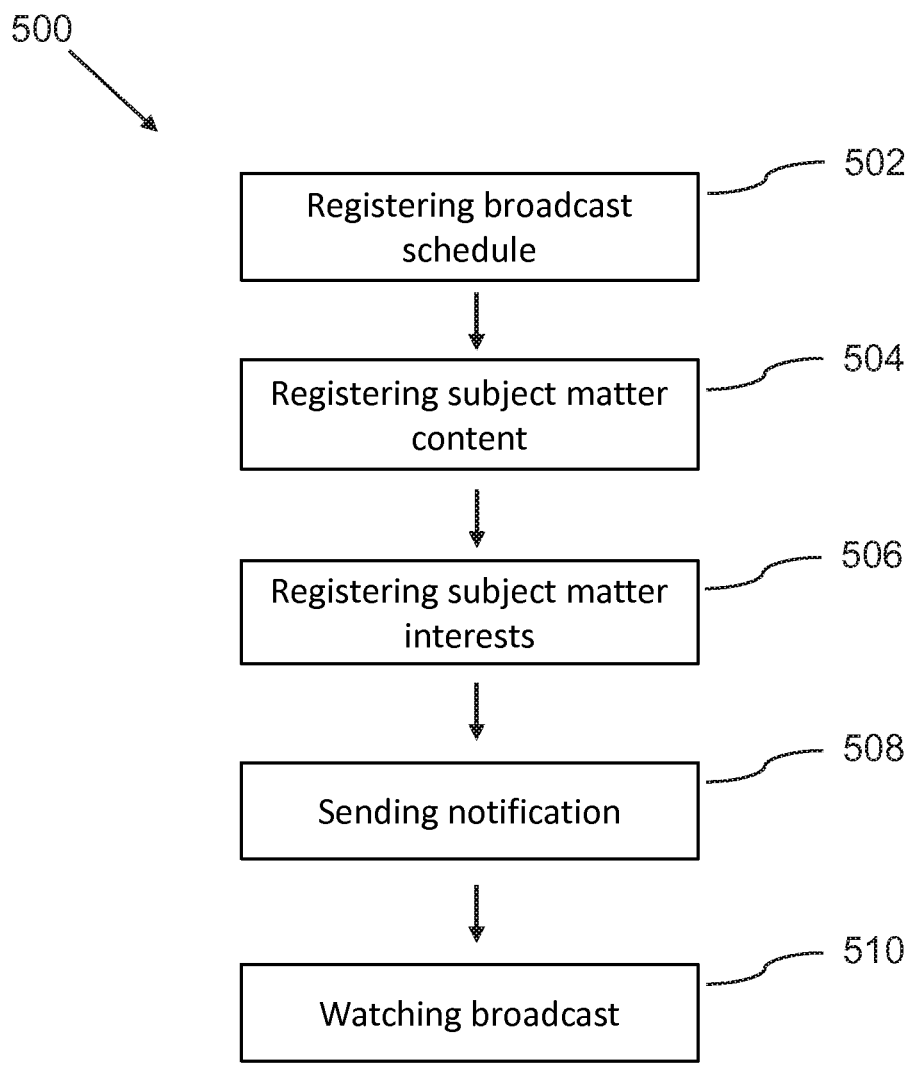

SYSTEM, DEVICE, AND METHOD FOR PROVIDING AUDIENCES FOR LIVE VIDEO STREAMING

CROSS-REFERENCE TO RELATED APPLICATIONS

This application claims the benefit of U.S. Provisional Application No. 62/218,369, filed Sep. 14, 2015.

FIELD OF THE INVENTION

The present invention relates generally to the field of live video streaming and programming, and more particularly to methods and systems for providing an audience for live video programming.

BACKGROUND OF THE INVENTION

Consumers of live video content, including television broadcasts over various broadcast channels may be overwhelmed with the volume of content available and may not have effective methods for finding interesting programs, especially as it relates to live or breaking news programming that is not listed in published program guides.

With the proliferation of smart phones and other mobile devices with video recording capability, new system and methods for live video distribution have emerged in recent years. With such systems, a user can send a live broadcast, from a user point of view, of a live event, such as a concert, a conference, etc.

However, a broadcasting user may not have effective ways of reaching an audience, and other users that are interested in receiving interesting live content, may have no effective methods or systems to timely identify such live broadcasts.

Broadcasting users may attempt to use existing social networks, to post schedules and promotion for planned live broadcast, but in general postings on such network may only be viewed by a small fraction of users, and there are no general mechanisms or systems to ensure that interested users are made aware of a planned live broadcast.

As such, considering the foregoing, it may be appreciated that there continues to be a need for novel and improved devices and methods for providing an audience for live video broadcasts.

SUMMARY OF THE INVENTION

The foregoing needs are met, to a great extent, by the present invention, wherein in aspects of this invention, enhancements are provided to the existing models of scheduling and promoting planned broadcasts of live video.

In an aspect a system for live video streaming can include:
a) a live video server; and
b) a live video receiving device;
   such that the live video server sends a notification to a user about a scheduled live video broadcast, which matches with the user's subject matter interests, such that the notification includes a scheduled time of broadcast; whereby the user can view the scheduled live video broadcast at the scheduled time.

In a related aspect, the user can view the live video broadcast on the live video receiving device.

In another related aspect, the system for live video streaming can further include a live video broadcasting device, which can broadcast the scheduled live video broadcast from another user.

In yet a related aspect, the live video broadcasting device, can communicate with the live video server to store, process, and forward the schedule information and the associated subject matter domains for a set of scheduled live broadcasts, based on input from a second user.

In a further related aspect, the system for live video streaming can further include a broadcast management system, such that the broadcast management system stores and processes broadcast information about the live video broadcast, such that the broadcast management system communicates with the live video server to provide the broadcast information about the live video broadcast, including the time of broadcast and the subject matter content domain.

In a further related aspect, the system for live video streaming can further include a social network system, such that the social network system stores and processes broadcast information about the live video broadcast, wherein the broadcast information is posted in the social network system, such that the broadcast management system communicates with the live video server to provide the broadcast information about the live video broadcast, including the time of broadcast and the subject matter content domains.

In another aspect a live video combined device, can include functions of the live video receiving device and the live video broadcasting device.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a schematic diagram illustrating a system for live video streaming, according to an embodiment of the invention.

FIG. 2 is a schematic diagram illustrating a live video streaming server, according to an embodiment of the invention.

FIG. 3 is a schematic diagram illustrating a live video receiving device, according to an embodiment of the invention.

FIG. 4 is a schematic diagram illustrating a live video broadcasting device, according to an embodiment of the invention.

FIG. 5 is a flowchart illustrating steps that may be followed, in accordance with one embodiment of a method or process of live video streaming.

DETAILED DESCRIPTION

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a system for live video streaming 100, for providing live video audiences, with reference to FIG. 1, in such manner that like reference numerals refer to like components throughout; a convention that we shall employ for the remainder of this specification.

In an embodiment a system for live video streaming 100 can comprise:
 a) a live video server 102; and
 b) a plurality of live video receiving devices 104, such that the live video devices are connected to the live video server 102 via a network connection;
 wherein the live video server 102 can be configured to store and process schedule information for scheduled live broadcasts;
 wherein the live video server 102 is configured to store information on viewing interests of a first receiving user 124, such that the live video server is configured to store a subject matter interest domain of the first receiving user 124, wherein the subject matter interest domain is received via a live video receiving device 104;
 such that the live video server 102 sends a notification to the first receiving user 124, for a live video broadcast, which may be of interest to the first receiving user 124.

In a related embodiment, the live video receiving device 104 is configured to broadcast the live video broadcast to the live video server 102, such that the first receiving user can view the live video broadcast on the live video receiving device 104.

In a related embodiment, the live video broadcast can be transmitted on a separate broadcast network 130, such that the live video broadcast can include:
 a) a television broadcast sent via antenna transmission, cable tv, internet distribution, or closed circuit to be viewed by the first receiving user 124 on a television 160, or other broadcast/video viewing device 160;
 b) an internet based live video stream, which can be viewed on a browser. Optionally, the live video receiving device 104 can connect directly with the live video stream, such that the first receiving 124 user can view the internet based live video stream on the live video receiving device 104; and/or
 c) other video broadcast media, methods and systems.

In a further related embodiment, the system for live video streaming 100 can further include a broadcast management system 112, which manages broadcasts of live videos, such that the broadcast management system 112 communicates with the live video server 102 to provide information about scheduled live videos, including time of broadcast and subject matter content domains related to the videos.

In yet a further related embodiment, the system for live video streaming 100 can further include a social network system 114, which manages a network of users, who post content including live video broadcasts, such that the social network system 114 communicates with the live video server 102 to provide information about scheduled live videos, including time of broadcast and interest domains related to the videos.

In a related embodiment, users can subscribe to a subject matter or interest hash tag indicating that when a live feed/broadcast for that subject matter (that they selected) was scheduled to occur, they would be notified of such for the purpose of not missing the broadcast.

In a further related embodiment a receiving user 124 can be associated with a subject matter interest domain, which can include:
 a. A set of at least one subject matter, wherein the at least one subject matter can be represented by a symbol, such as a hash-tag, i.e. #racing, #bmw, #FrenchCooking, etc;
 b. A taxonomy of subject matters; or
 c. Other structure for identifying a set, such as a list, partial order, lattice, or network of subject matters.

In a further related embodiment a scheduled video broadcast can be associated with a subject matter content domain, which can include:
 a. A set of subject matters, such that the set of subject matters includes at least one subject matter, wherein the at least one subject matter can be represented by a symbol, such as a hash-tag, i.e. #racing, #bmw, #FrenchCooking, etc;
 b. A taxonomy of subject matters; or
 c. Other structure for identifying a set, list or network of subject matters.

In a related embodiment, a subject matter content domain of a broadcast video, $D_{Video}$, matches with a subject matter interest domain, $D_{User}$, of a receiving user 124, if at least one subject matter of $D_{Video}$ is contained in $D_{User}$.

In related example embodiments, wherein the subject matter domain are sets of hashtags, we can for example have the following example occurrences:
 a) $D_{Video}$={#taylorswift}
  $D_{User}$={#taylorswift, #lamborghini, #justinbieber}
   i. $D_{Video}$ matches $D_{User}$ since #taylorswift is a shared subject matter;
 b) $D_{Video}$={#taylorswift, #lamborghini, #justinbieber}
  $D_{user}$={#taylorswift}
   ii. $D_{Video}$ matches $D_{User}$ since #taylorswift is a shared element;
 C) $D_{Video}$={#cars}
  $D_{User}$={#taylorswift, #lamborghini, #justinbieber}
   iii. There is no match, since #cars is not in $D_{User}$;
 d) $D_{Video}$={#taylorswift, #lamborghini, #justinbieber}
  $D_{User}$={#cars}
   iv. Here the receiving user cannot be assumed to be interested in the video (which could for example be a duet with Taylor Swift and Justin Bieber, that includes a scene of them driving a Lamborghini). There is no match, since no element of $D_{Video}$ (including #lamborghini) is in $D_{User}$.

Note in this example, the simple sets of hashtags do not include a semantics of containment, so #lamborghini is not interpreted as included in #cars.

In related example embodiments, wherein the subject matter domain are sets members of taxonomies, but could also be viewed as partial orders or lattices, we can for example have the following example occurrences:

a) $D_{Video}$={cars}
   $D_{User}$={singers.taylorswift, cars.lamborghini, singers.justinbieber}
   There is no match, since cars is not in $D_{User}$. Particularly, the larger taxonomic structure of cars is not contained in the smaller taxonomic structure cars.lamborghini.

b) $D_{Video}$={singers.taylorswift, cars.lamborghini, singers.justinbieber}
   $D_{User}$={cars}
   There is a match, since cars.lamborghini is included in $D_{User}$, particularly, the smaller taxonomic structure of cars.lamborghini is contained in the large taxonomic structure of cars. I.e., in this case the receiving user is interested in everything related to cars, and will therefore want to see a video with two singers driving a car, which in this case happens to be a Lamborghini.

In various related embodiments, a wide range of formal languages or natural languages can be used as a specification languages for subject matter domains. Such specification languages can include context free grammars and mark-up languages. Similarly, the matching relation can include a plurality of matching relations, such that $D_{Video}$ matching $D_{User}$ implies, or is consistent with a semantic interpretation, that the user with the subject matter interests $D_{User}$ will be interested in the video with subject matter content of $D_{Video}$.

In further related embodiments, if $D_{Video}$ and $D_{User}$ are specified in different specification languages or structures, they can be translated to a uniform/normalized language or structure, in order to allow calculation/determination of matching relationship. So for example $D_{Video}$ could be translated into the specification language for $D_{User}$, or vice versa, or alternatively both could be translated into a common third specification language.

In other further related embodiments, subject matter elements of $D_{Video}$ and $D_{User}$ are can be normalized to correct for common spelling mistakes, spelling variations, capitalization, etc.

In a related embodiment, a live video server 102 can include:

a) A processor 202;
b) A non-transitory memory 204;
c) An input/output component 206;
d) An interest manager 210, which is configured to store user information for registered users, and store and process subject matter interest domains for the users;
e) A video content manager 212, which is configured to store and process information for a set of scheduled broadcast, including schedule information and a subject matter content domain for each scheduled broadcast;
f) A video feed manager 214; which is configured to broadcast a live video to a plurality of live video receiving devices 104, wherein the live video is received from the live video broadcasting device 106;
g) A broadcast controller 216, which is configured to communicate with the broadcast management system 112, such that the broadcast controller 216 receives broadcast information about live video broadcasts, including the time of broadcast and the subject matter content domain; and
h) A social network controller 218, which is configured which is configured to communicate with the social network system 114, such that the broadcast controller 216 receives broadcast information about live video broadcasts that has been posted in the social network system 114, wherein the broadcast information includes the time of broadcast and the subject matter content domain; all connected via
i) A data bus 220.

In a related embodiment, a live video receiving device 104 can include:

a) A processor 302;
b) A non-transitory memory 304;
c) An input/output 306;
d) An interest controller 310, which is configured to store and process a content matter interest domain for a receiving user 124, received as input from the receiving user 124;
e) A notification controller 312, which is configured to receive notifications for scheduled video broadcasts, wherein the subject matter content domains of the scheduled video broadcasts intersect with the subject matter content domain of the receiving user 124, whereby the scheduled video broadcasts are of interest to the receiving user 124; and
f) A streaming viewer 314, which is configured to display a selected scheduled video broadcast to the receiving user 124; all connected via
g) A data bus 320.

In a related embodiment, a live video broadcasting device 106 can include:

h) A processor 402;
i) A non-transitory memory 404;
j) An input/output 406;
k) A content controller 410, which is configured to communicate with the live video server to store, process, and forward schedule information and associated subject matter domains for a set of live broadcasts, based on input from the broadcasting user 126;
l) A streaming transmitter 412, which is configured to send a live video broadcast to the live video server 102, at a scheduled time of broadcast, wherein the live video broadcast is recorded via the input/output 406; all connected via
m) A data bus 420.

In a further related embodiment, a live video combined device 110, can include components of the live video receiving device 104 and the live video broadcasting device 106, whereby a live video combined device 110 during runtime can be configured to operate as a live video receiving device 104, a live video broadcasting device 106, or a combination of both, such that the live video combined device 110 can include:

a) The processor 302;
b) The non-transitory memory 304;
c) The input/output 306;
d) The interest controller 310;
e) The notification controller 312;
f) The streaming viewer 314;
g) The content controller 410; and
h) The streaming transmitter 412; all connected via
i) The data bus 320.

In related embodiments, each of the live video receiving device 104 and the live video broadcasting device 106, and the live video combined device 110 can include configurations as:
a) A web application, executing in a Web browser;
b) A tablet app, executing on a tablet device, such as for example an Android or iOS tablet device;
c) A mobile app, executing on a mobile device, such as for example an Android phone or iPhone, or any wearable mobile device;
d) A desktop application, executing on a personal computer, or similar device;
e) An embedded application, executing on a processing device, such as for example a smart TV, a game console or other system.

In a related embodiment, the system for live video streaming 100 can be configured to register users who provide their contact information, including email; mobile phone number; social media platform user name, such as for Twitter, Facebook, etc; and other means of contact, for the purpose of notifying them in advance of a coming live video broadcast of stated interest to them at a specified time.

In a related embodiment, the system for live video streaming 100 can be configured to provide an audience of receiving users 124, who request notification for various subject matters, such that other broadcasting users 126 or broadcast management systems 112 can offer live feeds (broadcasts) to satisfy and entertain receiving users 124 with content that matches the users' registered interest domain.

In a further related embodiment, a notification can be a message that is sent from the live video server 102 to the live video receiving device 104, such that a receiving user 124 can view the notification via the notification controller 312. In some embodiments, a receiving user 124 can customize a notification period, such that the receiving user 124 for example can set a predetermined notification period of 5 minutes, one hour, or two days, etc. Alternatively, a receiving user 124 can set up multiple notifications, each with a customizable notification period. In this manner a receiving user 124 can for example set up a notification schedule such that she receives 3 notifications, respectively 1 day, 1 hour, and 5 minutes before a scheduled broadcast.

In related embodiment, the live video server 102 can further be configured to send a notification as a text message, an email, or as another type of message sent via a messaging system or messaging app.

In a related embodiment, the notification controller 312 can be configured to allow a receiving user 124 to browse received notifications, such that the receiving user 124 can view a chronological schedule of upcoming broadcasts. In further embodiments, the schedule of broadcasts can be filtered or sorted by type, category, tag, subject matter, broadcasting user 126, or other metadata. In further related embodiments, the notification controller 312 can be configured to search the received notifications, such that a receiving user 124 can input a keyword to search for matching notifications.

In a related embodiment, the live video server 102 can be configured to receive a rating of a scheduled broadcast in communication with the live video receiving device 104, wherein the live video receiving device 104 receives an input of the rating from a receiving user 124; such that a receiving user 124 can view a scheduled broadcast, such that the receiving user 124 can provide a rating of the broadcast, either at the time of broadcast or after the broadcast. The rating can be a numeric rating, for example on a scale of 1 to 5, where 1 indicates a poor rating and 5 indicates an excellent rating.

In an example embodiment, Taylor Swift, a celebrity and famous pop star, can be registered in the system with a subject matter domain that includes #taylorswift, and can register a scheduled time for a broadcast using the live video receiving device 104, such that the live video server 102 subsequently notifies all receiving users 124 that have subscribed to "#taylorswift" of the scheduled live broadcast.

In a related embodiment, the system for live video streaming 100, can provide an audience of receiving users 124 for a live broadcast, based on the subject matter domain that the audiences have elected to be notified of.

In a further related embodiment, the live video server can be configured to calculate an anticipated audience size for the live video broadcast, such that the live video server counts all users with a subject matter interest domain that is matched by a subject matter content domain of the live video broadcast. Thereby a broadcasting user 126 who has registered the live broadcast with a scheduled time, can obtain an estimate of the available audience.

Thereby, in various embodiments, the system for live video streaming 100 can be configured to (1) provide receiving users 124 notification of live video content that they are interested in, and (2) provide interested audiences 124 to broadcasting users 126 that wish to provide live video content.

In a related embodiment, a broadcast providing user 126 can register an offer to sell broadcasting rights of a scheduled broadcast, such that a broadcast management system 112 or another receiving user 124 can obtain access to broadcast rights for a scheduled broadcast by providing a payment for the broadcasting rights.

It shall be understood that an executing instance of an embodiment of the system for live video streaming 100, as shown in FIG. 1, can include a plurality of live video server devices 104, which are each tied to one or more receiving users 124.

An executing instance of an embodiment of the system for live video streaming 100 can similarly include a plurality of live video server servers 102, which can each be connected to a plurality of broadcast management systems 112 and a plurality of social network systems 114.

In an embodiment, as illustrated in FIG. 5, a method for live video streaming 500, can include:
a) Registering broadcast schedule 502, wherein schedule information for a set of scheduled broadcasts is stored on the live video server 102;
b) Registering subject matter content 504, wherein a subject matter content domain for each scheduled broadcast in the set of scheduled broadcasts is stored on the live video server 102;
c) Registering subject matter interest 506, wherein a subject matter interest domain for a first user 124 is stored on the live video server 102;
d) Sending notification 508, wherein the live video server 102 sends a notification to the first user about a suggested scheduled broadcast, which is selected from the set of scheduled broadcasts, such that a subject matter content domain of the suggested scheduled broadcast matches with the subject matter interest domain of the first user; and
e) Watching broadcast 510, wherein the first user watches the suggested scheduled broadcast at the scheduled time of broadcast.

In a related embodiment, the method for live video streaming 500, can further include:

rating the suggested scheduled broadcast, wherein the first user 124 determines a rating of the suggested scheduled broadcast, such that the rating is stored by the live video server.

In a related embodiment, the method for live video streaming 500, can further include:

calculating an anticipated audience size for the suggested scheduled broadcast, wherein the live video server calculates the anticipated audience size by counting all users with a subject matter interest domain that is matched by a subject matter content domain of the suggested scheduled broadcast.

FIGS. 1, 2, 3, and 4 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1, 2, 3, and 4 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

FIG. 1 shows a depiction of an embodiment of the system for live video streaming 100, including the live video server 102, and the live video receiving device 104. In this relation, a server shall be understood to represent a general computing capability that can be physically manifested as one, two, or a plurality of individual physical computing devices, located at one or several physical locations. A server can for example be manifested as a shared computational use of one single desktop computer, a dedicated server, a cluster of rack-mounted physical servers, a datacenter, or network of datacenters, each such datacenter containing a plurality of physical servers, or a computing cloud, such as Amazon EC2 or Microsoft Azure.

It shall be understood that the above-mentioned components of the live video server 102, the live video receiving device 104, live video receiving device 106, and the live video combined device 110 are to be interpreted in the most general manner.

For example, the processors 202 302 402, can each respectively include a single physical microprocessor or microcontroller, a cluster of processors, a datacenter or a cluster of datacenters, a computing cloud service, and the like.

In a further example, the non-transitory memories 204 304 404 can each respectively include various forms of non-transitory storage media, including random access memory and other forms of dynamic storage, and hard disks, hard disk clusters, cloud storage services, and other forms of long-term storage. Similarly, the input/outputs 206 306 406 can each respectively include a plurality of well-known input/output devices, such as cameras, microphones, screens, keyboards, pointing devices, motion trackers, communication ports, and so forth.

Furthermore, it shall be understood that the live video server 102, the live video receiving device 104, the live video broadcasting device 106, and the live video combined device 110 can each respectively include a number of other components that are well known in the art of general computer devices, and therefore shall not be further described herein. This can include system access to common functions and hardware, such as for example via operating system layers such as Windows, Linux, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the live video server 102 communicates with the live video receiving device 104, the live video broadcasting device 106, the broadcast management system 112, and the social network system 114 over at least one network, which can include the general Internet, a Wide Area Network or a Local Area Network, or another form of communication network, transmitted on wired or wireless connections. Wireless networks can for example include Ethernet, Wi-Fi, Bluetooth, ZigBee, and NFC. The communication can optionally be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the system for live video streaming 100, including devices and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the components of the live video server 102, the live video receiving device 104, and the live video broadcasting device 106. The components of the live video server 102 can be distributed over a plurality of physical, logical, or virtual servers. Parts or all of the components of the live video receiving device 104 and/or the live video broadcasting device 106 can be configured to operate in the live video server 102, the live video receiving device 104 and/or the live video broadcasting device 106 for example can function as thin clients, performing only graphical user interface presentation and input/output functions. Alternatively, parts or all of the components of the live video server 102 can be configured to operate in the live video receiving device 104 and/or the live video broadcasting device 106.

In some alternative embodiments, parts or all of the functions of the live video server 102 can be a part of a server backend of the social network system 114 and parts or all of the functions of the live video receiving device 104 and the live video broadcasting device 106 can be a part of a GUI front end of the social network system 114, whereby the social network system 114, such as Facebook, Twitter, or other social networking systems, can thereby function as a the system for live video streaming 100.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A system for live video streaming, comprising:
a) a live video server;
b) at least one live video receiving device; and
c) at least one live video broadcasting device;
wherein the live video server is configured to store and process broadcast information for a set of scheduled broadcasts, including schedule information and a subject matter content domain for each scheduled broadcast;
wherein the live video server is configured to communicate with the at least one live video receiving device to receive and store a subject matter interest domain of a first user;
such that the live video server is configured to send a notification to the first user, for a live video broadcast in the set of live video broadcasts, such that the notification includes a scheduled time of broadcast and a subject matter content domain for the live video broadcast, wherein the subject matter content domain matches with the subject matter interest domain, whereby the live video broadcast is of interest to the first user;
such that the at least one live video receiving device is configured to show the live video broadcast at the scheduled time of broadcast;
wherein the live video broadcasting device is configured to send the live video broadcast to the live video server, at the scheduled time of broadcast; and
wherein the live video server is configured to calculate an anticipated audience size for the live video broadcast, such that the live video server counts all registered users with a subject matter interest domain that is matched by a subject matter content domain of the live video broadcast, such that the live video broadcasting device is configured to receive, store, and display the anticipated audience size.

2. The system for live video streaming of claim 1, wherein the live video broadcasting device is further configured to communicate with the live video server to store and process the broadcast information for the set of live broadcasts, based on input from a second user, such that the live video broadcasting device communicates the broadcast information to the live video server.

3. The system for live video streaming of claim 1, further comprising:
a broadcast management system;
wherein the broadcast management system is configured to store and process broadcast information about the live video broadcast, such that the broadcast management system communicates with the live video server to provide the broadcast information, including the time of broadcast and the subject matter content domain.

4. The system for live video streaming of claim 1, further comprising:
a social network system;
wherein the social network system is configured to store and process broadcast information about the live video broadcast, wherein the broadcast information is posted in the social network system, such that the broadcast management system communicates with the live video server to provide the broadcast information, including the time of broadcast and the subject matter content domain.

5. The system for live video streaming of claim 1, wherein the live video server further comprises:
a) a processor;
b) a non-transitory memory;
c) an input/output component;

d) an interest manager, which is configured to store user information for users, and store and process a subject matter interest domain for each user;
e) a video content manager, which is configured to store and process the information for the set of scheduled broadcasts, including the schedule information and the subject matter content domain for each scheduled broadcast;
f) a video feed manager; which is configured to broadcast the live video broadcast to a plurality of live video receiving devices, wherein the live video broadcast is received from the live video broadcasting device;
g) a broadcast controller, which is configured to communicate with a broadcast management system, such that the broadcast controller updates the broadcast information in communication with the broadcast management system; and
h) a social network controller, which is configured to communicate with a social network system, such that the social network controller updates the broadcast information for the set of scheduled video broadcasts, based on information that is posted in the social network system; all connected via
i) a data bus.

6. The system for live video streaming of claim 1, wherein the live video receiving device further comprises:
a) a processor;
b) a non-transitory memory;
c) an input/output component;
d) an interest controller, which is configured to store and process the content matter interest domain for the first user, wherein the content matter interest domain is received as input from the user via the input/output component;
e) a notification controller, which is configured to receive and display the notification for the live video broadcasts; and
f) a streaming viewer, which is configured to display the live video broadcast, at the scheduled time of broadcast; all connected via
g) a data bus.

7. The system for live video streaming of claim 1, wherein the live video broadcasting device further comprises:
a) a processor;
b) a non-transitory memory;
c) an input/output component;
d) a content controller, which is configured to communicate with the live video server to store and process the broadcast information for the set of live broadcasts, based on input from a second user, such that the content controller communicates the broadcast information to the live video server; and
e) a streaming transmitter, which is configured to send the live video broadcast to the live video server, at the scheduled time of broadcast, wherein the live video broadcast is recorded via the input/output component; all connected via
f) a data bus.

8. The system for live video streaming of claim 1, wherein the live video server is configured to receive a rating of the live video broadcast in communication with the live video receiving device, wherein the live video receiving device receives an input of the rating from the first user.

9. A method for live video streaming, comprising:
a) registering broadcast schedule, wherein schedule information for a set of scheduled broadcasts is stored on a live video server;
b) registering subject matter content, wherein a subject matter content domain for each scheduled broadcast in the set of scheduled broadcasts is stored on the live video server;
c) registering subject matter interest, wherein a subject matter interest domain for a first user is stored on the live video server;
d) sending notification, wherein the live video server sends a notification to the first user about a suggested scheduled broadcast, which is selected from the set of scheduled broadcasts, such that a subject matter content domain of the suggested scheduled broadcast matches with the subject matter interest domain of the first user;
e) watching broadcast, wherein the first user watches the suggested scheduled broadcast at a scheduled time of broadcast; and
f) calculating an anticipated audience size for a selected scheduled broadcast, which is selected from the set of scheduled broadcasts, wherein the live video server calculates the anticipated audience size by counting all registered users with a subject matter interest domain that is matched by a subject matter content domain of the selected scheduled broadcast.

10. The method for live video streaming of claim 9, further comprising:
rating the suggested scheduled broadcast, wherein the first user determines a rating of the suggested scheduled broadcast, such that the rating is stored by the live video server.

11. A system for live video streaming, comprising:
a) a live video server; and
b) at least one live video broadcasting device;
wherein the live video server is configured to store and process broadcast information for a set of scheduled broadcasts, including schedule information and a subject matter content domain for each scheduled broadcast;
wherein the live video server is configured to communicate with at least one live video receiving device to receive and store a subject matter interest domain of a first user;
such that the live video server is configured to send a notification to the first user, for a live video broadcast in the set of live video broadcasts, such that the notification includes a scheduled time of broadcast and a subject matter content domain for the live video broadcast, wherein the subject matter content domain matches with the subject matter interest domain, whereby the live video broadcast is of interest to the first user;
wherein the live video server is configured to calculate an anticipated audience size for the live video broadcast, such that the live video server counts all registered users with a subject matter interest domain that is matched by a subject matter content domain of the live video broadcast, such that the live video broadcasting device is configured to receive, store, and display the anticipated audience size.

12. The system for live video streaming of claim 11, further comprising:
at least one live video receiving device;
wherein the at least one live video receiving device is configured to show the live video broadcast at the scheduled time of broadcast.

13. The system for live video streaming of claim 11, further comprising:
a social network system;
wherein the social network system is configured to store and process broadcast information about the live video broadcast, wherein the broadcast information is posted in the social network system, such that the broadcast management system communicates with the live video server to provide the broadcast information, including the time of broadcast and the subject matter content domain.

* * * * *